United States Patent [19]

Jaumann et al.

[11] Patent Number: 4,697,773
[45] Date of Patent: Oct. 6, 1987

[54] VERTICALLY ADJUSTABLE POST FOR A FILM OR TELEVISION CAMERA TRIPOD

[75] Inventors: Leonhard Jaumann, Munich; Helmut Kus, Ottobrunn, both of Fed. Rep. of Germany

[73] Assignee: Sachtler GmbH Filmtechnische Gerate, Garching, Fed. Rep. of Germany

[21] Appl. No.: 826,569

[22] Filed: Feb. 5, 1986

[30] Foreign Application Priority Data

Feb. 8, 1985 [DE] Fed. Rep. of Germany ....... 3504362

[51] Int. Cl.⁴ ............................................. F16M 11/00
[52] U.S. Cl. ................................ 248/162.1; 248/123.1
[58] Field of Search ................... 248/123.1, 157, 631, 248/162.1; 297/338, 345; 108/147; 267/124, 64.15; 188/288, 289, 317; 277/116.2, 163, 123; 354/293

[56] References Cited

U.S. PATENT DOCUMENTS

| | | | |
|---|---|---|---|
| 2,064,527 | 12/1936 | Ericsson | 188/288 X |
| 2,404,111 | 7/1946 | Underwood | 267/64.15 |
| 2,707,388 | 5/1955 | Kent | 277/157 X |
| 2,710,077 | 6/1955 | Fabel et al. | 188/288 |
| 2,828,960 | 4/1958 | Lucien et al. | 267/64.15 |
| 2,963,175 | 12/1960 | Thornhill | 188/288 X |
| 3,038,542 | 6/1962 | Loomis | 277/116.2 |
| 3,101,955 | 8/1963 | Olson | 277/157 X |
| 3,306,620 | 2/1967 | Taschenberg | 277/163 X |
| 3,436,084 | 4/1969 | Courter | 277/116.2 |
| 3,921,992 | 11/1975 | Bertin | 277/163 X |
| 3,989,211 | 11/1976 | Gundlach | 248/162.1 |
| 4,094,484 | 6/1978 | Galione | 248/162.1 |
| 4,108,423 | 8/1978 | Skubal | 267/64.15 |
| 4,350,346 | 9/1982 | Fowler | 277/116.2 X |
| 4,373,707 | 2/1983 | Molders | 267/124 X |
| 4,519,617 | 5/1985 | Butler | 277/125 X |
| 4,544,144 | 10/1985 | Ishida et al. | 267/64.15 |

*Primary Examiner*—J. Franklin Foss
*Attorney, Agent, or Firm*—Hayes, Davis & Soloway

[57] ABSTRACT

A vertically adjustable post for a tripod (1) for a film or television camera wherein a pneumatic piston-cylinder assembly (4) is used as a vertically adjustable element. In order to obtain uniform camera support over the whole range of adjustment of the pneumatic assembly (4), the piston rod (12) of the pneumatic assembly (4) is frusto conical. The piston rod (12) is sealed against the cylinder (14) of the pneumatic assembly (4) by means of a radially resilient seal (15) which adapts to the varying diameter of the piston rod (12).

19 Claims, 8 Drawing Figures

FIG. 4a 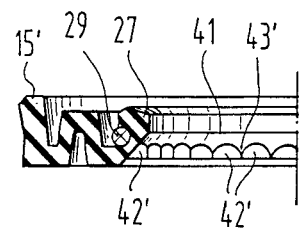 FIG. 4b 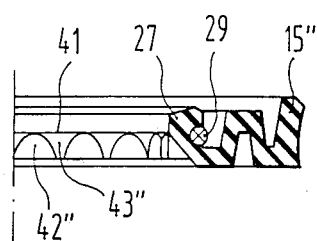
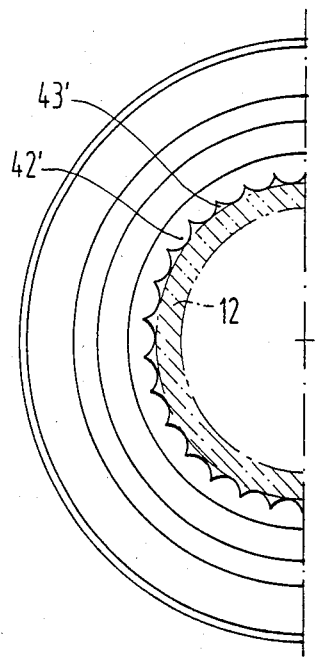 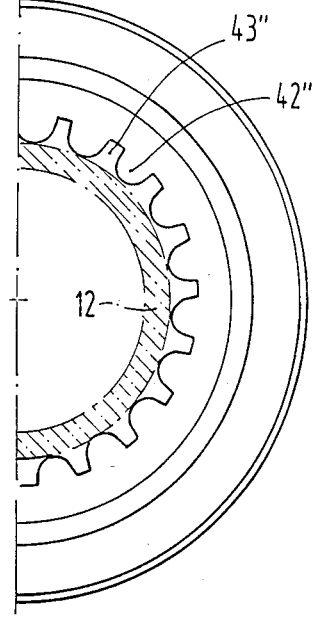
FIG. 5a FIG. 5b

VERTICALLY ADJUSTABLE POST FOR A FILM OR TELEVISION CAMERA TRIPOD

TELEVISION CAMERA TRIPOD

The invention relates to an adjustable pneumatic assembly, especially the central post of a stand for mounting a film or television camera.

Posts that are vertically adjustable or of variable length and have a pneumatic piston-cylinder assembly as the adjustable element have been used in many areas of the art. The construction of such pneumatic assemblies has been modified in many ways in the course of time, but in principal is based on U.S. Pat. No. 168,980 of the year 1875, which described a shock absorber for an automobile. In that special field of application a series of solutions has been found whereby it is possible to adjust the force/damping characteristic of a pneumatic assembly. Especially noteworthy in this regard are pneumatic assemblies which progressively stiffen toward their two final positions; See W. German Pat. No. 2,760,667 and W. German Pat. No. 2,836,662. In such pneumatic assemblies a rolled membrane has been used as a working piston, which upon change in the length of the pneumatic assembly unrolls over adequately shaped dies; see also, for instance W. German Pat. No. 1,107,030.

Pneumatic piston-cylinder assemblies having a cylindrical piston rod have also been used in stands on which film or television cameras are mounted in order to compensate for the weight of the camera; see W. German Published Patent Application No. 2,710,647. The pneumatic assembly here incorporated into the stand as a central post carries at its upper end a pivotable head upon which the camera is mounted. The central post can be secured in any desired position—for instance, by a friction coupling. If the camera has to be moved to any other height, the friction coupling is released and the camera is led to the new height. The inner pressure of the pneumatic assembly adjusts to the weight of the camera, and only slight force is needed to bring the camera to the new position.

In the pneumatic assemblies known already for use with cameras the ratio of total gaseous volume to piston rod volume is already quite high compared to other low-pressure pneumatic assemblies of small size used elsewhere. This means that they tend to be relatively large in size to maintain a relatively constant support over the whole length of the spring and still cannot be optimally adjusted to the weight of the camera. Accordingly, the camera does not maintain the adjusted position when the friction coupling is released.

Thus, when the camera is brought to a new height, the cameraman must hold the camera at this new height and check the position thereof before locking the friction coupling. As soon as he leaves the camera without the friction coupling having been locked, the position of the camera changes according to the characteristic rate of the pneumatic assembly. Therefore, the cameraman always needs both hands just to change the height of the camera. Since the cameraman has also other tasks to do during this change such as tilting the camera to a new position, adjusting optics, etc., it would be desirable to simplify the vertical adjustment of the camera and the locking thereof in the new position. This would be possible if the pneumatic assembly had a characteristic rate of movement constant along the entire length of its stroke so that the camera could be held at any height just by pressure within the pneumatic assembly itself.

To obtain such a substantially constant support, some stands with pneumatic supports have large pressure tanks where the ratio of total volume to piston rod volume is even higher and the pressure tanks may become very large. The expense for filling the pressure tank is prohibitive; and the costs of production, the construction volume and the weight of such a stand are correspondingly great. But an advantage in this design is that the central post of the stand remains in practically any position and thus it is possible to work with a steady camera without locking the central post into a fixed position.

The problem solved by the present invention is to provide a vertically adjustable post, especially a central post of a stand for mounting film or television cameras, in which an exactly constant characteristic support is obtained with a simple construction and small size so that a camera can be maintained in a constant position even when the central post is not locked in position.

According to the invention there is provided a pneumatic assembly of adjustable length comprising:

a cylinder closed at a first end thereof;

a piston slideable disposed in said cylinder and of a stroke to provide said adjustable length;

a piston rod attached to said piston and extending through a second end of said cylinder, said piston rod being of greater cross-sectional area adjacent said piston than its cross-sectional area at the point it extends through said second end;

a seal disposed to seal said second end to said piston rod throughout said stroke; and means to permit equalization of pressure on opposite sides of said piston.

Constant support force is provided when the effects on the support force due to pressure changes in the cylinder, resulting from the changing volume of the piston rod within the cylinder with movement of the piston along its stroke, are balanced by changes in the force exerted on the piston rod side of the piston due to changes in effective operating area of said piston rod side of said piston resulting from the frusto-conical form of the piston rod.

It has been found that such radially resilient seals that adjust to the changeable cross section of the piston rod can be relatively simply produced as axially relatively short rings. The seal preferable has a substantially W-shaped cross section with a relatively sharp sealing lip to minimize friction on the piston rod and prevent deformation when the central post is vertically adjusted and the starting jolts associated therewith occur. A relatively sharp (axially short) lip also minimizes the working surface for the gaseous pressure. The seal may be made of synthetic material or rubber, plastic material reinforced with fiber or fabric. The so-called self-lubricating materials such as plastic material compounded with graphite in order to prevent the packing from adhering to the piston rod are also advantageous. However, the material must provide sufficient annular resilience of the sealing lip to accommodate the variation piston rod diameter.

In a vertically adjustable post according to the invention, it is possible to obtain a constant characteristic rate of support with a simple construction. For the above mentioned field of application in connection with a stand for mounting a film or television camera, this means that the camera can be kept stable in any vertical adjustment even when the central post of the stand is not locked in place. The cameraman can therefore otherwise adjust the camera even when the central post is not locked in place. The size of a central post according to the invention can be kept relatively small. The gaseous volume, given the same function and action, amounts to only one twentieth of the gaseous volume needed for the aforementioned central posts which have an approximately constant characteristic rate of movement. The space for the pressurized gas can be further increased by making the piston rod hollow and conicity of the piston rod can be made very gradual so that the resilient seal can follow effectively the change in diameter of the piston rod.

If the change in diameter of the piston rod were to be calculated mathematically to obtain an absolutely constant support, then the piston rod would have to have a curvature slightly different from a strictly conical shape. However, the differences in the support determined thereby are below the frictional forces in the vertical adjustment of the central post and thus neglectable. For reasons of production engineering, therefore, the conical shape is preferred.

The invention will now be described, by way of example, with reference to the accompanying drawings, in which.

Figure 1:
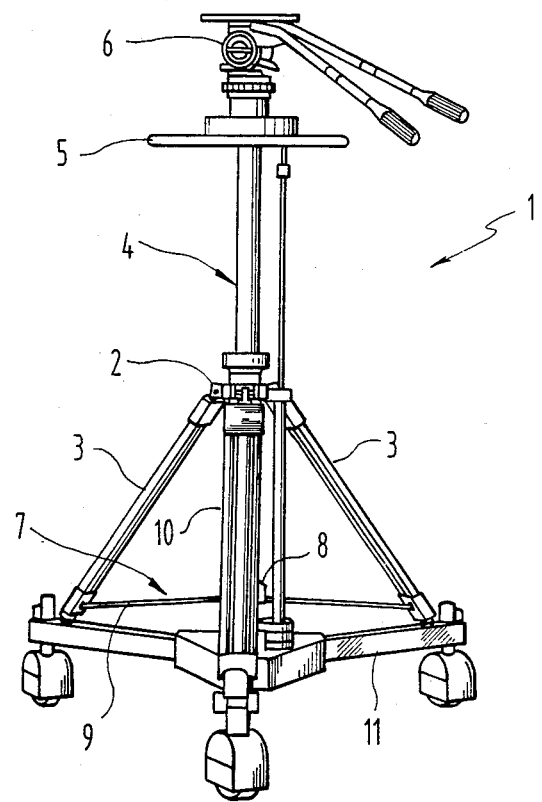
FIG. 1 is a diagrammatic view of a tripod having a vertically adjustable central post designed as pneumatic support.

FIGS. 4a and 4b respectively a cross section through opposite halves of two radially resilient seals of different design.

FIGS. 5a and 5b are under views of the seals of FIGS. 4a and 4b respectively.

A tripod 1 has three legs 3 of adjustable length pivotally attached to a supporting ring 2 and, as a vertically adjustable upright central post, a pneumatic piston-cylinder assembly 4 mounted on the supporting ring 2 and carrying on its upper end a supporting device 5 on which is mounted a rotatable head 6 for accommodating a film or television camera. The length of the tripod legs 3 is fixed with the aid of a clamping device 7, which has a slide sleeve 8 and bars 9 respectively leading from said slide sleeve 8 to the tripod legs 3. The slide sleeve 8 slides on a cylindrical cup-shaped housing 10 of the vertically adjustable pneumatic assembly 4, which housing extends downwardly from the supporting ring 2. The tripod 1 is superposed on a dolly 11.

Figure 2:
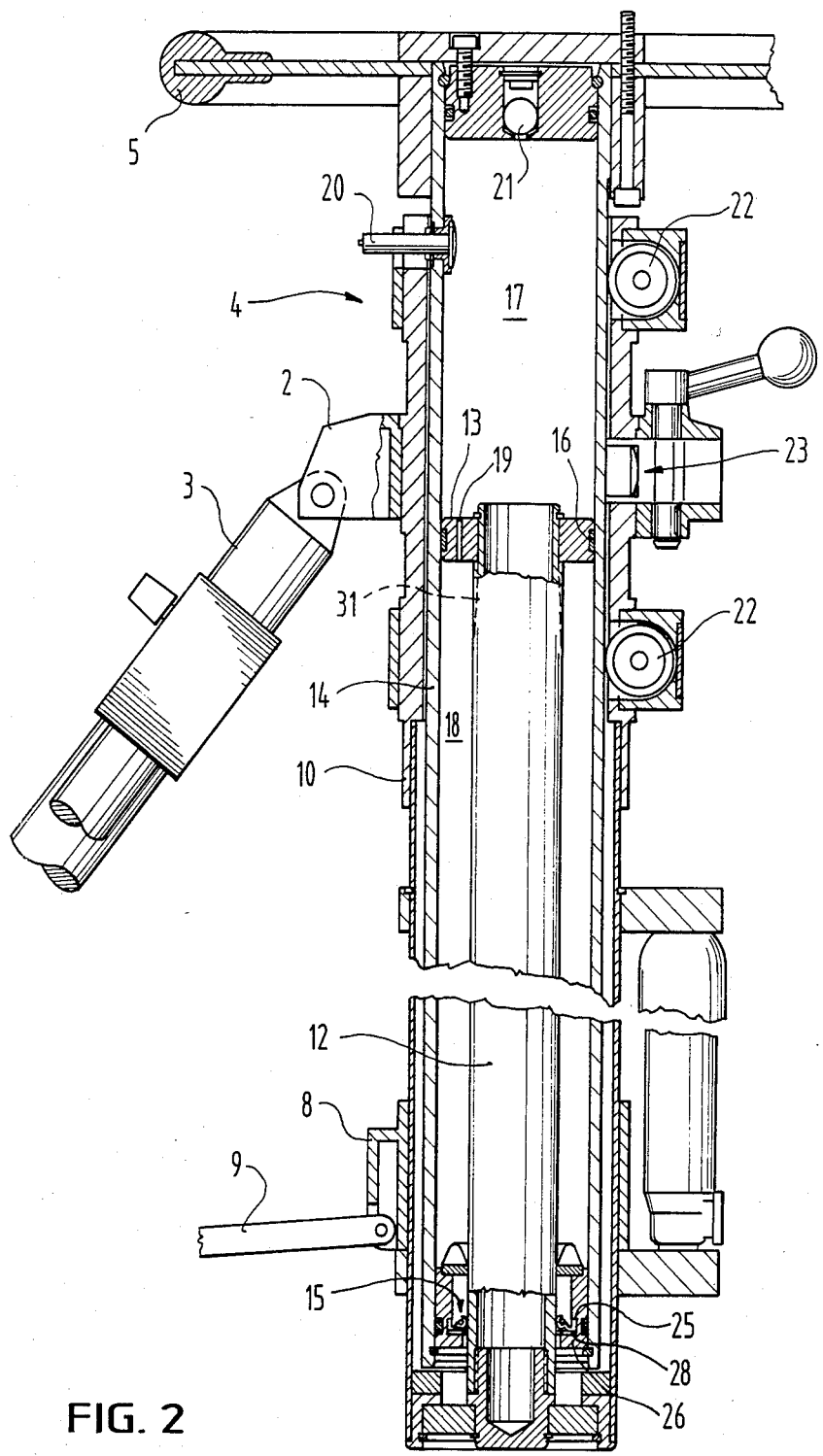
FIG. 2 is a sectional view of the central post.

The vertically adjustable central post is illustrated in detail in FIG. 2.

At the bottom of the upwardly open cylindrical housing 10 there is fastened an upwardly extending central hollow piston rod 12, which at its free open end carries a guide piston 13. On this guide piston 13 is put in inverted position a cup-shaped internal cylinder 14, which at its lower end is sealed gastight to the piston rod 12 by means of a seal 15. The guide piston 13, which also has a piston ring 16 for the internal cylinder 14, divides the interior of the internal cylinder 14 in two parts, which are an upperhollow space 17 and a lower hollow space 18, in which space 18 is situated the piston rod. Both spaces 17 and 18 are interconnected by a small orifice 19 within the guide piston 13. The orifice 19 has throttling action so that the gas exchange between the spaces 17 and 18 during the vertical adjustment of the assembly 4 takes place only at a certain speed. Besides, the unlocked pneumatic assembly will extend at a speed limited by the orifice 19 even when the tripod head and camera are not mounted. Safety in manipulation is thereby increased, since otherwise the quickly extending pneumatic assembly would carry considerable risk of damage for the operator.

The interior of the internal cylinder 14 is filled with pressurized gas, which is introduced into the internal cylinder via a valve 20, for instance, by a simple air pump. The supporting device 5 for the tripod head 6 is connected with the upper end of the internal cylinder. In the upper stop plate of the internal cylinder is also situated a relief pressure valve 21.

The tripod is prepared for operation as follows: The internal cylinder 14 of the pneumatic assembly 4 is not filled with pressure gas initially. The friction coupling is unlocked, then the camera to be used is superposed on the tripod head 6. The interior of the internal cylinder 14 is then filled with pressurized gas via the valve 20 until the camera is held in position—that is, the weight of the camera is balanced by the gas forces. In the interior of the internal cylinder and in the interior of the piston rod 12 the same gaseous pressure prevails at all times as a result of the opening between the hollow spaces 17 and 18 through the orifice 19. The pneumatic assembly 4 can then be vertically adjusted by pulling or pressing on the supporting device 5. The effective force of the pneumatic assembly is precisely multiplied, owing to the existing effective piston force at the height of the seal 15, by the pressure existing in the internal cylinder 14, which changes as consequence of the change of volume during the vertical adjustment of the stand.

For better guidance of the internal cylinder 14 several guide rollers 22 are provided in the housing 10, distributed around the periphery, which abut on the outer wall of the internal cylinder 14 and assist the central guidance thereof. In addition, the internal cylinder can also be fixed at any height desired by means of a friction coupling device 23 which acts upon the outer wall of the internal cylinder 14.

Figure 3A:
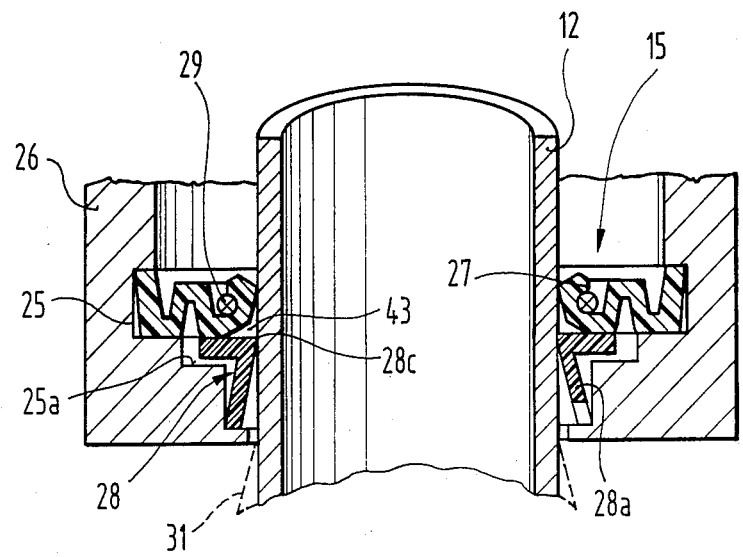
FIGS. 3a and 3b are respectively a cross-section through the central post in the bottom area and a topview of a supporting ring.
Figure 3B:
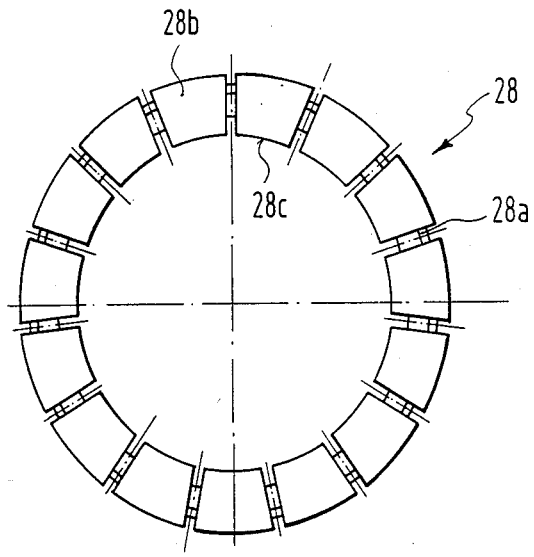

The central piston rod 12 beginning from its fastening point at the bottom of the housing 10, enlarges substantially conically in the direction toward the guide piston 13 in order to compensate for volume or pressure changes during the lifting. In a pneumatic assembly for cameras of up to about 20 kilograms, the piston rod is about 50 cm long and has a diameter of about 28 millimeters at the bottom and about 30.5 millimeters on the guide piston 13. The conicity of the piston rod in combination with the gaseous pressure is calculated so as always to counterbalance, independently of the actual length of the pneumatic assembly, the weight of the camera including the tripod head 6, which means that the characteristic support provided by the pneumatic assembly remains exactly constant along the complete stroke length. The sealing ring 15, which is shown in detail in FIG. 3a, is made resilient enough to be able to follow the changed diameter of the piston rod 12. The sealing ring 15 has for this purpose a substantially W-shaped cross section. The sealing is introduced in a groove 25 of a lower stop ring 26 of the internal cylinder 14. It abuts by the outer leg of the W on the sidewall of said groove 25, the inner leg of the W is provided in the upper area with a relatively sharp annular lip 27, which abuts on the piston rod 12. A supporting ring 28, shown face on in FIG. 3b, made of polytetrafluoroethylene and of angular cross section, is inserted in another graded groove 25a contiguous with the groove 25. Said supporting ring has an annular stem 28a from which there extend directly beneath the packing ring 15 horizontal plates 28b separated from each other by small gaps, to support the sealing ring 15. The gaps between the plates 28b also enable this radially elastic supporting ring 28 to follow the different diameters of the piston rod 12. The support provided by the ring 28 for the sealing ring 15 permits the pneumatic assembly to be operated at higher pressures to accommodate very heavy film or television cameras. In order that the annular lip 27 fully abuts on the piston rod 12 along any position thereof, there is additionally provided a spring ring 29 which surrounds and reinforces the lip 27.

To obtain a damping effect when entering into the respective final position, the diameter of the piston rod can be respectively enlarged at the lower end and reduced at the upper end along a short damping length. This is indicated in ghost with lines 30 or 31 in FIG. 2.

In FIGS. 4a and 4b are respectively shown a cross section through opposite halves of a modified sealing rings 15' and 15" and FIG. 5a and 5b show a bottom view of each of these. The sealing rings 15' and 15" have substantially the same W-shaped cross section as the sealing ring shown in FIG. 3. Beneath the annular lip 27, which is pressed against the piston rod 12 by a spring ring 29, there is provided an outwardly inclined slope 41 with ribs 42' and 42" protruding from the surface thereof The surface of said ribs facing the piston rod 12 is a cylindrical surface so that the ribs abut on the piston rod 12 with an axial generatrix. Between the ribs there thus results recesses 43' and 43".

In the embodiment according to FIGS. 4a and 5a, the ribs 42' directly abut each other along the inner periphery of the seal 15' so that the recesses 43' are correspondingly small. In the embodiment according to FIGS. 4b and 5b, the ribs 42" are spaced apart along the inner periphery of the seal 15' so that the recesses 43" reaching to the bevel 41 are correspondingly larger.

The recesses 43' and 43" beneath the annular lip can also be shaped differently. Their purpose is that when the supporting device 5 is downwardly pressed the inner walls of the seal, due to deformation, do not abut a large surface on the piston rod and thus prevent a smooth displacement of the pneumatic assembly. In the recesses 43' or 43" additional oil is introduced so that lubrication is improved.

We claim:

1. A vertically adjustable post, capable of forming the central post of a tripod for mounting a camera, having as vertically adjustable element an pneumatic cylinder including a cylindrical cup-shaped housing, a central piston rod connected to the bottom of said housing and carrying on its free end a guide piston, slidingly passed between said housing and said guide piston and a piston rod is a cup-shaped internal cylinder which rests on said guide piston and on said piston rod via sealing means and is connected at its closed end with a vertically adjustable supporting device for the camera, said guide piston having an orifice between the spaces of said internal cylinder that it divides, and said internal cylinder being -adapted to be filled with a pressurized gas, wherein the diameter of said piston rod, has an increasing taper from the guide piston to the bottom of said housing (10) such that said pneumatic cylinder (4) provides a substantially constant upwardly acting support force throughout the stroke of the piston in the cylinder and said sealing means (15), between said internal cylinder (14) and said piston rod (12), being radially resilient and having a serpentine cross-section to permit expansion and contraction of said sealing means for constantly maintaining a sealing engagement with the variation in diameter of said piston rod (12).

2. A post according to claim 1, wherein said piston rod (2) enlarges itself substantially conically between its point of fastening to the bottom of said housing (10) and said guide piston (13).

3. A post according to claim 1, wherein said seal between said piston rod (12) and said internal cylinder (14) is a ring (15) with a resilient annular lip (27) abutting on said piston rod (12).

4. A post according to claim 1, wherein said seal (15) has a W-shaped radial cross-section and abuts on said piston rod (12) at the upper end of the radially inner W-leg.

5. A post according to claim 4, wherein said seal (15', 15") has recesses along said inner W-leg beneath said annular lip (27).

6. A post according to claim 5, wherein studs (42', 42") abutting on said piston rod (12) are provided between said recesses (43', 43").

7. A post according to claim 3, wherein said seal (15) between said internal cylinder (14) and said piston rod (12) is made of resilient material.

8. A post according to claim 7, wherein said seal (15) between said internal cylinder (14) and said piston rod (12) is made of a self-lubricating material.

9. A post according to claim 1, wherein said piston rod (12) is hollow.

10. A post according to claim 2, wherein over a short length the diameter of said piston rod (12) is enlarged at its lower end and reduced (31) at the upper end facing said guide piston (13).

11. A post according to claim 1, wherein said seal (15) rests on a radially resilient supporting ring (28) which is accommodated in a groove (25a) of said internal cylinder (14) and which has a circular edge (28c) abutting on said piston rod (12) in the manner of a second seal.

12. A pneumatic supporting device of adjustable length comprising:
an internal cylinder closed at a first end thereof;
a piston slidable disposed in said cylinder and having a stroke to provide said adjustable length;
a piston rod, attached to said piston and extending out through a second end of said cylinder, being of greater cross-sectional area adjacent said piston than at the point it extends out through said second end;
a sealing means disposed at said second end of said cylinder to said seal piston rod throughout said stroke;
said piston divides said cylinder into two spaces and said spaces are interconnected via a small orifice in said piston;
wherein when said cylinder is filled with a pressurized compressible fluid said great cross-sectional area of the piston rod provides said supporting device with a substantially constant upwardly acting support force throughout said stroke, and said sealing means being resilient and having a serpentine radial cross-section which permits radial expansion and contraction for constantly maintaining a sealing engagement with said piston rod throughout said stroke.

13. An assembly according to claim 12, wherein said seal incorporates a garter spring to urge said lip into sealing engagement with said piston rod and said seal is axially supported remote from said cylinder's interior by a radially deformable axially rigid annular support member.

14. An assembly according to claim 12 wherein said means is an oriface extending from one side of said piston to the other and sized to damp movement of said piston relative to said cylinder by restricting transfer of fluid in said cylinder from said one side of said piston to the other.

15. An assembly according to claim 12 comprising means for adjusting pressure of said fluid to adjust the support force.

16. An assembly according to claim 12 when said fluid is air.

17. An assembly according to claim 12 in combination with a tripod for a camera; said assembly being vertically oriented to provide vertically adjustable support, with a substantially constant vertical support force for a said camera throughout said vertical adjustment.

18. A combination according to claim 17, wherein said assembly is vertically disposed between a tripod base structure and a support for a said camera with said piston rod rigidly attached to said base structure and said cylinder attached to said support.

19. An assembly according to claim 12 wherein the change in cross-sectional area of said piston rod is chosen to vary the effective working area of the piston rod side of said piston, with movement of said piston along its stroke, to balance the effects, a said outwardly acting support force provided by said assembly when said cylinder is filled with a pressurized compressionable fluid, of changes in pressure within said cylinder due to changes in cylinder volume resulting from the presence of said piston rod as the piston moves along its stroke.

* * * * *